Nov. 6, 1934.  H. C. GRAVES, JR., ET AL  1,979,683
SWITCH STRUCTURE
Filed Jan. 22, 1932   4 Sheets-Sheet 1

INVENTORS
William M. Scott Jr.
BY and Herbert C. Graves Jr.
Cornelius D. Ehret
their ATTORNEY

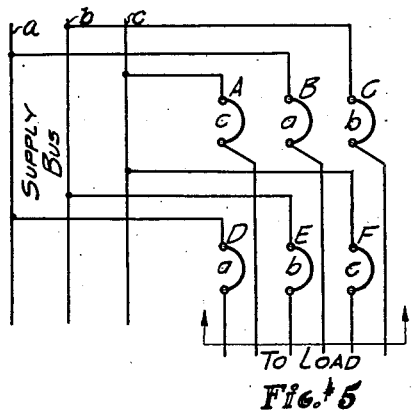
Fig.⁺5
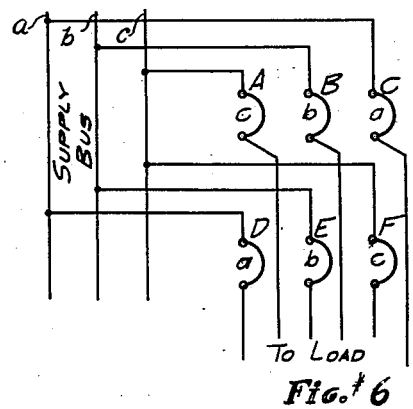
Fig.⁺6
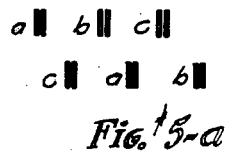
Fig.⁺5-a
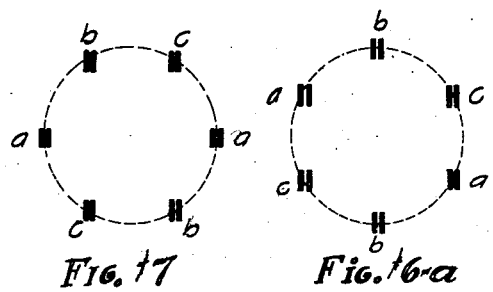
Fig.⁺7    Fig.⁺6-a
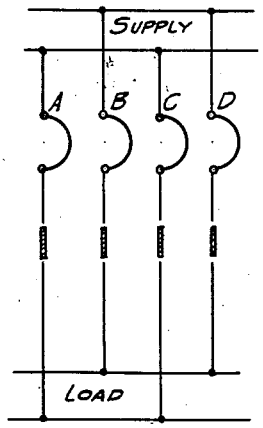
Fig.⁺12-a
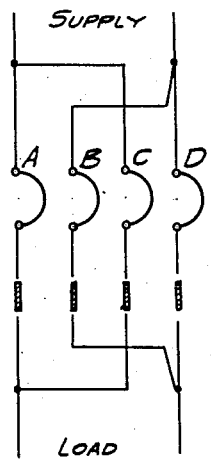
Fig.⁺12

Nov. 6, 1934.  H. C. GRAVES, JR., ET AL  1,979,683
SWITCH STRUCTURE
Filed Jan. 22, 1932  4 Sheets-Sheet 3

INVENTORS
William M. Scott and
BY Herbert C. Graves Jr.
Cornelius L. Ehret
their ATTORNEY Patented Nov. 6, 1934

1,979,683

UNITED STATES PATENT OFFICE 1,979,683

SWITCH STRUCTURE

Herbert C. Graves, Jr., Radnor, Radnor Township, Chester County, and William M. Scott, Jr., Philadelphia, Pa., assignors to I-T-E Circuit Breaker Company, Philadelphia, Pa., a corporation of New Jersey Application January 22, 1932, Serial No. 588,218

20 Claims. (Cl. 175—294)

Our invention relates to electrical switch structures, and particularly to switches for controlling alternating current circuits.

The building of alternating current switches adapted to carry large currents has been complicated by the inductive effects in and between the circuit controlling elements, as the switch contact members, which effects tend to cause overheating of the contact members and appreciably reduce the current carrying capacity of the switch. When alternating current is flowing in a conductor, the magnetic field established thereby causes the current flow to be greater in the outer surface portions of the conductor than in its central portions because the number of electromagnetic lines of force or flux linkages is greater at the center, so that the inductance, and consequently the impedance to current flow, is higher in the central portions of the conductor, and therefore the greater part of the current flows near its surface where the impedance is least. This condition is usually referred to as the "skin effect" of alternating current, and is particularly pronounced in solid conductors of large cross-sectional area, and in adjacent parallel conductors. If a group of adjacent conductors are electrically connected in multiple so that the current flowing therein is in the same direction and of the same phase, the inner conductors are linked by a greater number of lines of force than the outer conductors and therefore have a higher inductance so that the greater part of the current flows in the outer conductors; if parallel conductors have current flowing therein in opposite directions, the magnetic fields are in opposed relation and there is less flux linkage between the adjacent portions of the conductors than between the more remote portions, and the inductance in the remote portions is therefore greater, so that the greater part of the current will flow in the adjacent portions of the conductors where the inductance is less. This condition causes a distortion of current distribution or an unequal current density in the conductors, and materially reduces their current carrying capacity or causes a large voltage drop; it furthermore causes heating of the conductors and losses incurred thereby.

By way of illustration, the problem of unequal current distribution in alternating current circuits is an important consideration in bus bar construction. For example, a normal grouping of bars is an exceedingly inefficient arrangement when given a uniform quarter inch spacing due to the crowding effect in the outer bus bars. Increase of spacing improves conditions but width becomes excessive. However, these same bars may be placed in what is referred to in the art as an "open square" construction, which gives a large decrease in voltage drop and better radiation conditions. The ends of the bars seen in Figs. 2 and 4 of the drawings for connection to the incoming and outgoing bus runs $a$, $b$, $c$ illustrate such an arrangement.

While normally in low frequency circuits, as in 25 and 60 cycle power lines, the inductive or skin effects are not as pronounced as in high frequency circuits, nevertheless, in switches carrying large currents, which may be of the order of several thousand amperes, these effects appreciably reduce the carrying capacity of the switch, and also tend to cause destructive heating.

In accordance with the invention, in switching mechanism connected to an alternating current circuit, two or more current carrying switch elements are multiply connected to each leg of the circuit to provide a plurality of current paths through the switch and thereby utilize a plurality of elements of smaller size, and the elements which are connected to the same leg, or to the same phase, of the circuit are alternated with switch elements connected to a different leg, or to a different phase, to reduce the unequal current density or distortion of current distribution caused by the crowding effect between neighboring parallel conductors carrying alternating current, and thereby increase the current carrying capacity of the switch, more particularly, the circuit controlling elements, for example, the blade and contact elements of a switch, or groups of such elements, are connected in parallel with similar elements or groups of the circuit breaker, and so arranged that the current passing through any one element or group of elements flows in the opposite direction in the case of single phase circuits, or is of a different phase in the case of polyphase circuits, from the current flowing in elements or groups of elements adjacent thereto, so that adjacent elements or groups are either of different polarity or different phase.

Further in accordance with the invention, the conductors which multiply connect switch elements in a circuit breaker to each leg, or to each phase, of an alternating current circuit are separated and led to switch elements, or groups of such elements, which are separated from each other by other switch elements or groups of elements connected to another leg or to a different phase of the circuit, to reduce distortion or unequal current density in the conductors; in one modification the conductors or small groups of conductors are spaced horizontally and vertically, and in another modification the conductors or small groups of conductors are disposed so that the current in each conductor or group has a given phase displacement with respect to the current in adjacent conductors or groups.

Further in accordance with the invention, overload protective apparatus, as one or more overcurrent relays or trip coils, is connected in circuit with each of the various multiply connected switch elements to trip the circuit breaker when the current flowing through any of the switch elements and/or through any leg of the power circuit, exceeds a predetermined magnitude, and, preferably, signalling apparatus, for example, an annunciator, indicates whether the circuit breaker has been tripped out by a current rise in one of the switch elements, or by a current rise in one of the legs of the power circuit.

The invention resides in the features of construction, combination and arrangement hereinafter disclosed and claimed.

For a better understanding of the invention, and to illustrate some of the various forms it may take, reference is had to the accompanying drawings, in which:

Figs. 5 and 6 are diagrammatic representations of modified arrangements of the switch elements, and Figs. 5a and 6a show the spacing and arrangement of the conductors.

Fig. 7 shows another conductor arrangement.

Figure 10:
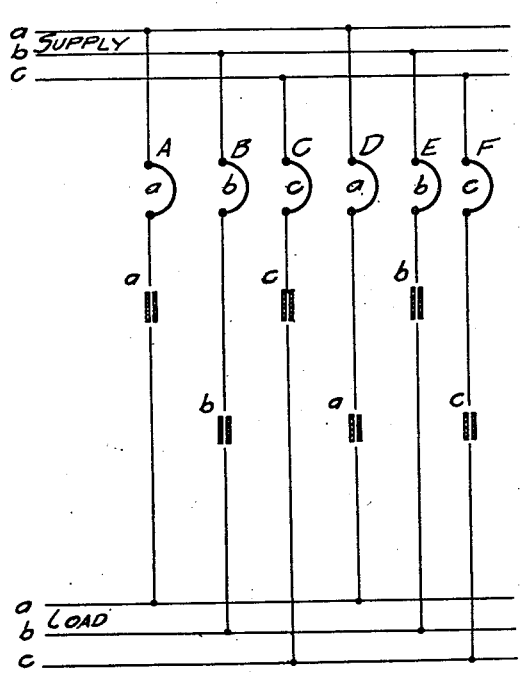
Figure 11:
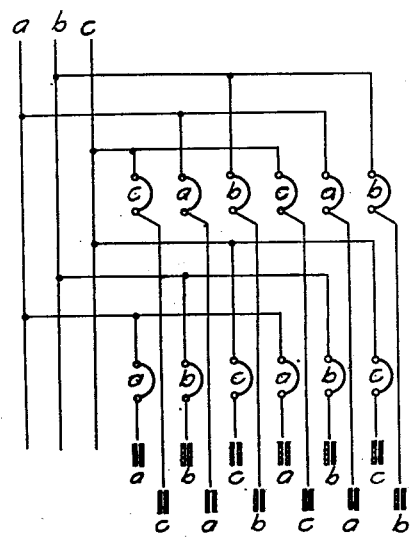

Figs. 10 and 11 diagrammatically illustrate different arrangements and connections for the switch elements and conductors of a circuit breaker in accordance with the invention.

Figure 14:
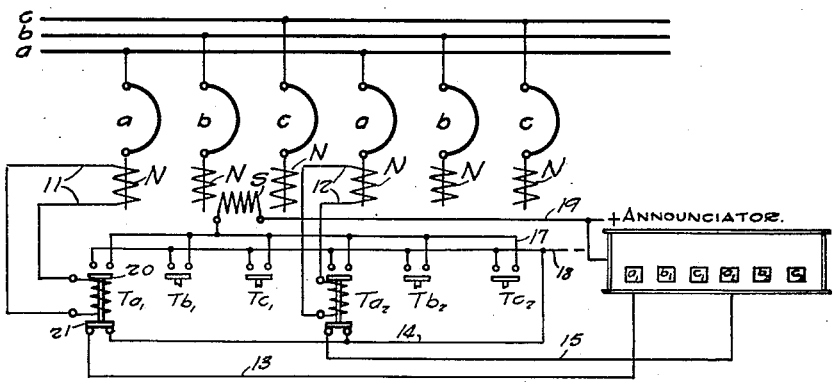
Figure 13:
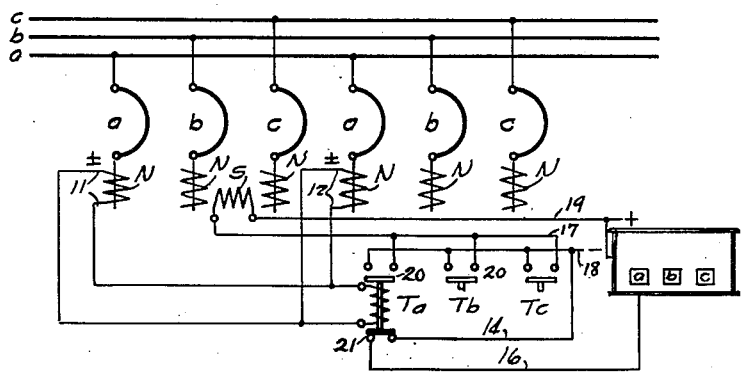
Figure 15:
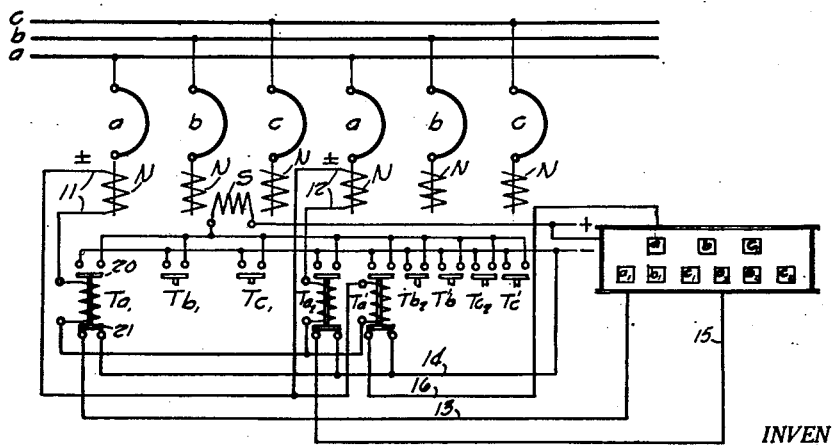

Figs. 12 and 12a diagrammatically illustrate a two pole switch for controlling a single phase circuit, and embodying the invention; and Figs. 13, 14 and 15 disclose various overcurrent protective arrangements for circuit breakers having switch elements connected in multiple.

Figure 2:
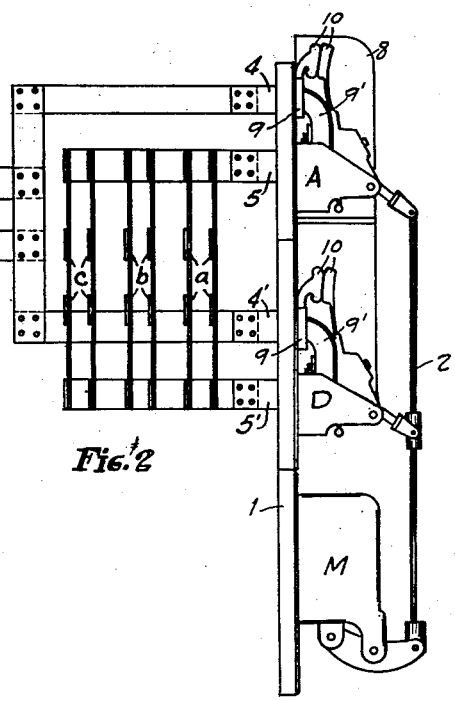
Fig. 2 is a side elevational view of the circuit breaker of Fig. 1, showing one arrangement of the conductors which inter-connect the multiply connected switch elements.
Figure 1:
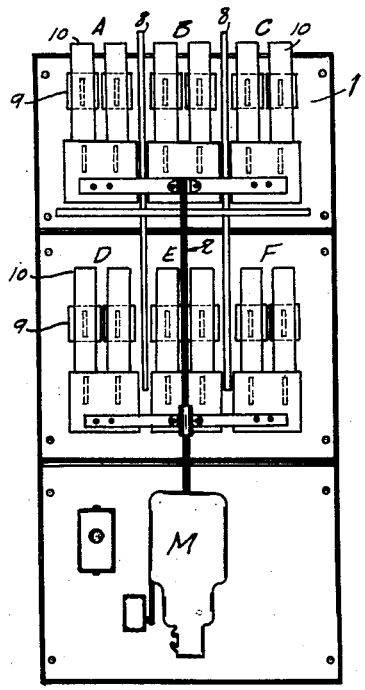
Fig. 1 is a front elevational view of a three pole circuit breaker having groups of switch elements, and embodying the features of the invention.

Referring now particularly to Figs. 1 and 2 of the drawings, there is shown a circuit breaker comprising six switches A, B, C, D, E, F, disposed in two horizontal rows of three switches each, and mounted on a panel 1 of slate, or other suitable insulating material. The individual switches, which will hereinafter be referred to as switch elements, each comprises a group of two blade and terminal contact assemblies operating as a unit, although each switch element may comprise any other suitable number of contact assemblies, as one, three, or more. Each contact assembly preferably comprises main current-carrying contacts 9 including a bridge element 9', and auxiliary arcing contacts 10, with the contact assemblies separated by arc barriers 8, 8. The switch elements are operatively connected together by operating rod structure 2, and are actuated by a single electromagnetic closing mechanism M, so that the six switch elements operate as a unit. Each switch element has an upper and a lower terminal 4 and 5, or 4' and 5', extending through the panel 1, and connected to groups of conductors arranged in an "open square" formation. In the arrangement illustrated, the circuit breaker is adapted to be connected at 6 to a three-phase supply line or bus, and to control the current supplied to a load circuit connected to the outgoing terminals 7.

Figure 4:
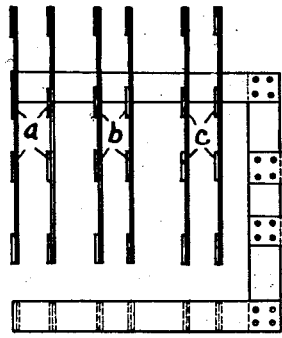
Figs. 3 and 4 are plan and rear views, respectively, of the conductors of Fig. 2.
Figure 3:
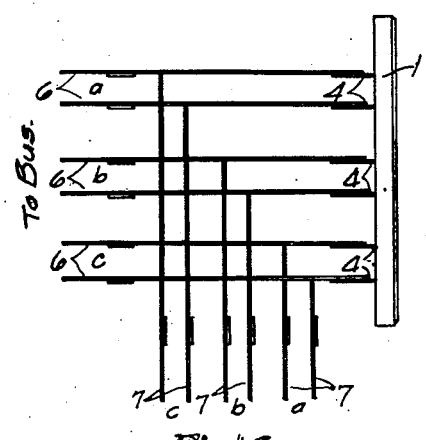

The manner of connecting the circuit breaker, and the incoming and outgoing circuits, is shown in Figs. 2, 3, and 4; Fig. 2 being a side view of the circuit breaker connections; Fig. 3 showing a top plan view of the connections (with the switch elements omitted); and Fig. 4 showing a rear elevation of the connections and interconnecting conductors.

The switch elements A, B, C, in the upper row are multiply connected to the switch elements D, E, F, in the lower row, that is, switches A and D, B and E, and C and F are respectively connected to the same phase, and therefore provide two separate current paths through the circuit breaker for each phase. Thus, switch elements of smaller cross-sectional area may be used with consequent reduction of crowding due to skin effect, because the skin effect in a plurality of conductors having a given total cross-sectional area is less than that in a single conductor of the same cross-sectional area. Also, the adjacent elements in the horizontal rows are connected to different phases of the alternating current circuit, so that there is a predetermined phase difference between the adjacent elements which are closely spaced and which are in inductive relation to each other, and this further minimizes distortion of current distribution in the switch elements, and thereby the current carrying capacity of the circuit breaker is appreciably increased.

The incoming circuit from the supply bus comprises phases $a$, $b$, and $c$ connected to the terminals 6. Preferably, the conductors of each phase of the incoming circuit comprise four bars in square formation arranged as the inter-connecting conductors shown in Fig. 4, and each terminal 6 has four extensions for connection thereto. Phase 1 comprises the two upper bars and the two lower bars $a$; phase 2 comprises the bars $b$; and phase 3 comprises the bars $c$. The incoming circuit from the supply bus may also comprise two horizontal runs in square formation connected directly to the terminals 4, 4' of the switch elements, and which may or may not be connected together at the points 6. The outgoing circuit is connected to the terminals 7, and preferably comprises bars arranged in square formation. The outgoing circuit may also be connected directly to the outgoing terminals 5, 5' of the switch elements, and may or may not be connected together at the points 7.

The upper incoming conductors of the group $a$, $b$, $c$ lead to the upper terminals 4 of the upper row of switch elements A, B, C, and the remaining incoming conductors of the group $a$, $b$, $c$ are connected to the upper terminals 4' of the lower row of switch elements D, E, F, as shown in Fig. 2. The outgoing conductors from the lower terminals 5 of the switch elements A, B, C, are bent to the left, as shown in Fig. 3, and when they reach a position clear of the $c$ group of conductors, vertical connections carry the conductors down to a point just above the outgoing conductors from the terminals 5' of switch elements D, E, F; from this point the conductors extend toward the left of the circuit breaker with the outgoing conductors in the same relative position as the incoming circuit. It is thus seen that while the copper used is equal to four groups of conductors per phase, each major group is subdivided during its path through the circuit breaker, so that the transmission efficiency is approximately that corresponding to two groups with a space between them, instead of four groups packed close together. This subdivision of the conductors in each phase greatly increases their carrying capacity for a given temperature rise.

Figs. 5 and 5a show another arrangement of switch elements and inter-connecting conductors. Each of the terminals of the switch elements A, B, C, D, E, F, is connected to the load by two bars arranged as shown in Fig. 5a. Preferably, this same arrangement is also maintained between the supply bus and the switch elements. The connections from the bus to the circuit breaker are shown as comprising two individual runs, but may comprise a single run which branches out at the circuit breaker in the manner shown by Figs. 2 and 4. It will be seen from Fig. 5a that there is a definite phase displacement between adjacent groups of conductors, and since the crowding effect is less pronounced between conductors in which the currents are out of phase, there is an appreciable reduction in crowding in the arrangement of Fig. 5 in which the two branches of the same phase are separated as far as possible, the arrangement of conductors forming a series of equilateral triangles with no two branches of one leg of the circuit in any one triangle.

The various switch elements A, B, C, D, E, F, are similarly arranged, so that the adjacent switch elements, either in horizontal or vertical rows, have a definite phase displacement between them. Thus, the upper switch element A which is connected to the c phase of the supply line is adjacent either switches B or D which are connected to phase a of the line; switch element B, which is connected to phase a of the line, is adjacent switch elements A, C, and E, which are connected to the two other phases of the line. Likewise, each of the remaining switch elements C, D, E, and F are adjacent switch elements of different phase, and thus the crowding effect in the switch elements is appreciably reduced with a consequent increase in their current carrying capacity.

Figs. 6 and 6a show a further modification in which the conductors from the switch elements are so arranged that the conductors carrying the same phase have the greatest spacing possible between them. Thus, even though the conductors between the switch elements and the load controlled thereby have a long run, the crowding effect between them will be reduced to a minimum value. With regard to the switch elements, while the elements B and E, which are both connected to phase b of the bus, are adjacent each other in a vertical direction, nevertheless, the spacing between the switch elements in the vertical direction, as will be seen from Fig. 1, is much greater than the lateral spacing between the elements in the horizontal rows, and therefore does not offset the advantage gained by the arrangement of conductors. Furthermore, the switch elements A and F, and C and D, which are connected to the same phase, have the maximum spacing between them and thus reduce the crowding effect to a minimum.

Fig. 7 shows another arrangement of conductors which may be more convenient for certain installations. In both arrangements of the conductors in Figs. 6a and 7, all conductors of each phase have the same position with respect to the conductors of the other phases of the circuit.

Figure 9:
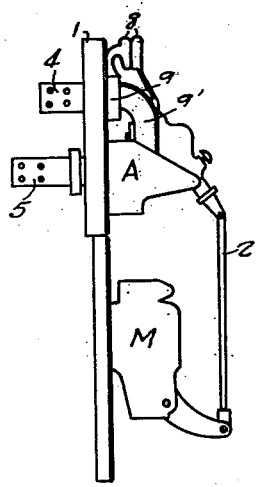
Figs. 8 and 9 are front and side elevational views, respectively, of a circuit breaker in which the switch elements are disposed horizontally in alignment.
Figure 8:
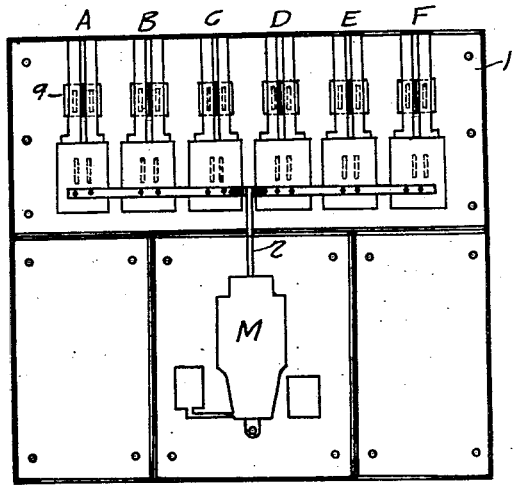

It is often more convenient, where the height is restricted, to place two three-pole circuit breakers side by side and connect them so as to operate as a unit. Figs. 8 and 9 show front and side elevational views, respectively of such an arrangement, and Fig. 10 diagrammatically illustrates a method of connecting the switch elements to reduce crowding. Two bars or conductors are connected between each switch element and the load, and the conductors are arranged in a triangular formation so as to obtain the greatest separation between groups of conductors carrying the same phase. The switch elements are also arranged so that there is a predetermined phase difference between adjacent elements.

Fig. 11 diagrammatically illustrates an arrangement in which twelve switch elements are grouped in two horizontal banks of six each, the switch elements and conductors being so arranged that adjacent elements and adjacent conductors have a given phase difference between them.

Figs. 12 and 12a show a single phase circuit, with switch elements A, B, C and D controlling the same, and embodying the invention. It will be seen that two paths are provided through the switch so that smaller switch elements may be used, and that adjacent switch elements are connected to the conductors of opposite polarity, instead of the same polarity. The result is an appreciable decrease in current distortion in the switch elements, and an increase in current carrying capacity.

Various types of circuit breakers known in the art may be used in any of the foregoing arrangements, although preferably they are of the type in which any of the contact elements or assemblies may be disconnected for cleaning, while the remaining contact elements connected in multiple therewith temporarily carry the full load, disclosed and claimed in a co-pending application of William M. Scott, Jr., Serial No. 467,398, filed July 12, 1930, for Switching mechanisms.

Figs. 13, 14 and 15 illustrate various protective or tripping arrangements for the circuit breakers disclosed. There are two conditions to be considered in applying protective or over-current tripping devices to the circuit breakers disclosed— first, the protection of the circuit, and second, the protection of the circuit breaker itself. In the first case it is necessary to provide means by which the total current flowing in one leg of the circuit may be determined, and a tripping device so connected as to open the breaker when this total current exceeds a predetermined value. An arrangement for this purpose, Fig. 13, comprises placing current transformers N on the leads of each switch element a, b, c, and connecting in parallel, with instantaneous polarities as indicated, those transformers which are on leads in the same leg of the circuit. Connections 11 and 12 from the transformers on the same leg are led to a circuit breaker over-current tripping relay Ta, Tb or Tc, calibrated to operate over a predetermined current range, and thus each relay measures the current flowing in one leg of the circuit. These relays control, by means of normally open contacts 20 and conductors 17, 18 and 19, a tripping magnet S which when energized trips the circuit breaker. Conductors 14 and 16 connect the lower normally closed contacts 21 of each of the trip relays T to an annunciator which, upon actuation of any relay and opening of its lower contacts, will cause the corresponding indicator or target a, b or c to be actuated and thereby indicate which of the relays has operated. For simplicity, only the tripping system of the leg or phase a is shown complete, but it will be understood that each of the other phases b, c are equipped with the same system, indicated by reference characters Tb and Tc.

When current is flowing in parallel circuits, it will divide itself between those circuits in inverse proportion to the impedance. Under normal conditions the bus bars and connections between the power source and the switch members, and between the latter and the load, should be so arranged that the impedance in the branches of each leg of the circuit is the same. The contact resistance of the circuit breaker bridges or contact elements will vary depending upon the condition of the contact surfaces and the care with which the operators clean the circuit breaker, and if extremely unbalanced conditions should arise, as due to high resistance contact surfaces, it is advisable to trip the circuit breaker for its own protection. The contact surfaces may be cleaned and adjusted by the attendant in a comparatively short time and the breaker put back on the line, while if the conditions were allowed to continue serious damage might occur. For the protection of the circuit breaker, therefore, a current transformer and overload coil for each switch element of the circuit breaker may be provided, as in Fig. 14, which shows the current transformers N connected to separate over-current relays Ta1, Ta2, etc. Conductors 13, 14, 15 connect the normally closed contacts 21 of each of the trip relays to the annunciator which, upon actuation of any relay will cause the corresponding indicator a1, b1, etc., to be actuated, and thereby indicate which of the switch units is carrying an excess current.

Fig. 15 shows a combination of the two foregoing systems with a transformer N in each branch of the circuit. A relay, as Ta1, or Ta2, etc., is connected in series with each of these transformers, and these two circuits connected in parallel and to a third relay as T'a, T'b, etc., which measures the current flowing in that leg of the circuit. The two series coils are adjusted to trip the circuit breaker at a current corresponding to the maximum load which the switch members will carry; the third trip coil is adjusted to trip the breaker in accordance with load conditions. This arrangement will therefore trip the breaker with an excess current in one leg of the circuit, or with excess current in either of the switch members connected to that leg. An annunciator or other indicator is connected by conductors 13, 14, 15, 16 so as to indicate as by a1, b1, c1, etc., whether the breaker has been tripped out by a condition in one of the contacts, or, as by a, b, c, a condition in the circuit itself.

The over-current relays used to protect these breakers are adjustable to various tripping currents, and may operate instantaneously, or may be equipped with a time delay device, or may be a combination of both instantaneous and time delay, all of which are well known in the art and need not, therefore, be described here. It will further be understood that the protective circuits and apparatus shown in Figs. 13, 14, and 15 are illustrative only, and that various other specifically different circuits and apparatus for performing the functions of those described may be employed in a manner well-known in the art.

What we claim is:

1. In combination with an alternating current circuit, switch structure for controlling the circuit, comprising two or more switch elements multiply connected to each leg of the circuit to provide separate current paths through the switch, the switch elements of each leg being separated by switch elements connected to a different leg, to thereby reduce distortion of current distribution in said elements.

2. Switching mechanism for controlling an alternating current circuit, comprising terminals for connection to the different legs of the circuit, a plurality of switch elements multiply connected to each terminal to provide a plurality of current paths through the switch, the switch elements which are connected to the same terminal being separated by switch elements connected to a different terminal, to thereby reduce distortion of current distribution in said elements.

3. Switching mechanism for controlling an alternating current circuit, comprising terminals for connection to the different legs of the circuit, a pluraltiy of switch elements multiply connected to each terminal to provide a plurality of current paths through the switch, the switch elements which are connected to the same terminal being alternately positioned with the switch elements connected to a different terminal, to thereby reduce distortion of current distribution in said elements.

4. Switching mechanism for controlling an alternating current circuit, comprising terminals for connection to the different legs of the circuit, a plurality of switch elements multiply connected to each terminal to provide a plurality of current paths through the switch, the switch elements which are connected to the same terminal being alternately positioned with the switch elements connected to each of the other terminals, to thereby reduce distortion of current distribution in said elements.

5. Switching mechanism for controlling a single phase alternating current circuit, comprising two or more switch elements multiply connected to each side of the circuit to provide a plurality of current paths through the switch, the switch elements of opposite polarity being alternately disposed, to thereby reduce unequal current density in said elements.

6. A circuit breaker for controlling an alternating current circuit, comprising a plurality of switch elements, each pole of the circuit breaker comprising two or more of said elements connected in multiple, the adjacent elements being respectively connected to comprise different poles of the circuit breaker.

7. A circuit breaker for controlling an alternating current circuit, comprising a plurality of switch elements, said elements being positioned in alignment, each pole of the circuit breaker comprising two or more of said elements connected in multiple, the adjacent elements being respectively connected to comprise different poles of the circuit breaker.

8. A circuit breaker for controlling an alternating current circuit, comprising a plurality of switch elements, said elements being positioned in horizontal and vertical rows, each pole of the circuit breaker comprising two or more of said elements connected in multiple, the adjacent elements in the horizontal and vertical rows being respectively connected to comprise different poles of the circuit breaker.

9. A circuit breaker for controlling an alternating current circuit, comprising a plurality of switch elements, each pole of the circuit breaker comprising two or more of said elements connected in multiple by conductors, the adjacent elements being respectively connected to comprise different poles, the said conductors which are adjacent each other being respectively connected to different poles of the circuit breaker.

10. A circuit breaker for controlling a single phase alternating current circuit, comprising a plurality of switch elements in inductive relation with respect to each other, two or more of said elements being multiply connected by separate conductors to each leg of the circuit to provide a plurality of current paths through the circuit breaker, the elements of opposite polarity being alternately positioned, and the conductors of opposite polarity being alternately disposed, thereby reducing distortion of current distribution in said elements and conductors.

11. A circuit breaker for controlling a polyphase alternating current circuit, comprising a plurality of switch elements in inductive relation with respect to each other, two or more of said elements being multiply connected by separate conductors to each phase of the circuit to provide a plurality of current paths through the circuit breaker, the elements of different phase being alternately positioned, and the conductors of different phase being alternately disposed, so that adjacent elements and adjacent conductors have a predetermined phase difference between them, thereby reducing distortion of current distribution in said elements and conductors.

12. In combination with an alternating current circuit, switch structure for controlling the circuit, comprising two or more switch elements multiply connected to each leg of the circuit to provide a plurality of current paths therefor through the switch, all of the switch elements which are connected to the same leg being separated by switch elements connected to a different leg, the group of switch elements connected to each leg having the same impedance thereby to give uniform impedance in each leg of the circuit.

13. In combination with an alternating current supply circuit, a multi-pole circuit breaker controlling a work circuit, the circuit breaker comprising a plurality of switch elements, each pole of the circuit breaker comprising two or more of said elements connected in multiple by conductors, the elements adjacent each other being respectively connected to comprise different poles, the said conductors which are adjacent each other being respectively connected to different poles of the circuit breaker, and the adjacent conductors of the said work circuit also being connected to different poles of the circuit breaker.

14. In combination with an alternating current circuit, switch structure for controlling the circuit, comprising two or more switch elements multiply connected to each leg of the circuit to provide separate current paths through the switch, the switch elements which are connected to the same leg being separated by switch elements connected to a different leg, and overload protective means in circuit with each of said switch elements and adapted to trip the circuit breaker when the current flowing through any of said switch elements exceeds a predetermined magnitude.

15. In combination with an alternating current circuit, switch structure for controlling the circuit, comprising two or more switch elements multiply connected to each leg of the circuit to provide separate current paths through the switch, the switch elements which are connected to the same leg being separated by switch elements connected to a different leg, and overload protective means comprising current transformers in circuit with each of said switch elements and connected to structure adapted to trip the circuit breaker when the current flowing through any of said switch elements exceeds a predetermined magnitude.

16. In combination with an alternating current circuit, switch structure for controlling the circuit, comprising two or more switch elements multiply connected to each leg of the circuit to provide separate current paths through the switch, the switch elements which are connected to the same leg being separated by switch elements connected to a different leg, and protective means comprising an overload relay in circuit with each of said switch elements, said relays being adapted to actuate tripping mechanism to cause the circuit breaker to open when the current flowing through any of said switch elements exceeds a predetermined magnitude.

17. In combination with an alternating current circuit, switch structure for controlling the circuit, comprising two or more switch elements multiply connected to each leg of the circuit to provide separate current paths through the switch, the switch elements which are connected to the same leg being separated by switch elements connected to a different leg, overload protective means in circuit with each of said switch elements adapted to trip the circuit breaker when the current flowing through any of said switch elements exceeds a predetermined magnitude, and overload protective means for each leg of the circuit connected to the said protective means for the switch elements and adapted to trip the circuit breaker when the current flowing through any leg of the circuit exceeds a predetermined magnitude.

18. In combination with an alternating current circuit, switch structure for controlling the circuit, comprising two or more switch elements multiply connected to each leg of the circuit to provide separate current paths through the switch, the switch elements which are connected to the same leg being separated by switch elements connected to a different leg, overload protective means in circuit with each of said switch elements adapted to trip the circuit breaker when the current flowing through any of said switch elements exceeds a predetermined magnitude, overload protective means for each leg of the circuit connected to the said protective means for the switch elements and adapted to trip the circuit breaker when the current flowing through any leg of the circuit exceeds a predetermined magnitude, and signal means connected to said protective means for indicating which of said protective means has operated to open the circuit breaker.

19. A circuit-breaker for controlling a polyphase alternating current circuit comprising a plurality of switch elements for each phase of said circuit, and a plurality of multiply-connected conductors for each phase of said circuit and individually connected to said switch elements, said conductors being so disposed that the conductors of each phase have inductive effects upon the several conductors of each of the other phases which are substantially equal.

20. In combination with an alternating current circuit, switch structure for controlling the circuit, comprising two or more switch elements multiply connected to each leg of the circuit to provide separate current paths through the switch, the switch elements which are connected to the same leg being separated by switch elements connected to a different leg to thereby reduce distortion of current distribution in said elements, and overload protective means responsive to the total current of the several switch elements of each leg effective to trip the breaker when said total current exceeds a predetermined magnitude.

HERBERT C. GRAVES, Jr.
WILLIAM M. SCOTT, Jr.